United States Patent
Flammer, III

(10) Patent No.: US 10,134,266 B2
(45) Date of Patent: Nov. 20, 2018

(54) DUAL MODE SMART GRID METER

(71) Applicant: SILVER SPRINGS NETWORKS, INC., Redwood City, CA (US)

(72) Inventor: George H. Flammer, III, Cupertino, CA (US)

(73) Assignee: ITRON NETWORKED SOLUTIONS, INC., Liberty Lake, WA (US)

( * ) Notice: Subject to any disclaimer, the term of this patent is extended or adjusted under 35 U.S.C. 154(b) by 1072 days.

(21) Appl. No.: 13/747,132

(22) Filed: Jan. 22, 2013

(65) Prior Publication Data

US 2014/0067330 A1    Mar. 6, 2014

Related U.S. Application Data

(60) Provisional application No. 61/697,086, filed on Sep. 5, 2012.

(51) Int. Cl.
| | | |
|---|---|---|
| *G08C 17/02* | (2006.01) | |
| *G06F 3/00* | (2006.01) | |
| *H04Q 9/00* | (2006.01) | |

(52) U.S. Cl.
CPC ............ *G08C 17/02* (2013.01); *G06F 3/00* (2013.01); *H04Q 9/00* (2013.01); *H04Q 2209/60* (2013.01)

(58) Field of Classification Search
CPC ...... G08C 17/02; H04Q 9/00; H04Q 2209/60; G06F 3/00
See application file for complete search history.

(56) References Cited

U.S. PATENT DOCUMENTS

| | | | | |
|---|---|---|---|---|
| 2008/0224892 A1* | 9/2008 | Bogolea | .............. | G01D 4/004 340/870.3 |
| 2010/0156665 A1* | 6/2010 | Krzyzanowski et al. | .................. | 340/870.02 |
| 2011/0063126 A1* | 3/2011 | Kennedy | .............. | G01D 4/002 340/870.02 |
| 2011/0169659 A1* | 7/2011 | Dalla | .................. | G01D 4/006 340/870.02 |
| 2011/0178651 A1* | 7/2011 | Choi et al. | ................... | 700/295 |
| 2013/0293391 A1* | 11/2013 | Osterloh | .............. | G01D 4/002 340/870.03 |

OTHER PUBLICATIONS

Alok Saboo, "New Itron Meters Take a Step Forward with Backward Compatibility", SmartGridNews, Sep. 15, 2009, http://www.smartgridnews.com, 2 pages.

* cited by examiner

*Primary Examiner* — Alexander Satanovsky
(74) *Attorney, Agent, or Firm* — Artegis Law Group, LLP

(57) ABSTRACT

One embodiment of the present invention sets forth a dual mode smart grid meter configured to operate within both an automatic meter reading (AMR) system and an advanced metering infrastructure (AMI) system. An AMR transmitter periodically transmits metrology data for interoperation with AMR reading operations. An AMI transceiver responds to AMI queries and commands for interoperation with AMI requirements. The disclosed dual mode smart grid meter beneficially enables utility operators to deploy or upgrade metering devices within an existing AMR network without disruption meter reading operations, while simultaneously preparing for an overall upgrade to reading operations based on AMI protocols.

19 Claims, 4 Drawing Sheets

DUAL MODE SMART GRID METER

CROSS-REFERENCE TO RELATED APPLICATIONS

This application claims benefit of U.S. provisional patent application Ser. No. 61/697,086, filed Sep. 5, 2012 which is hereby incorporated herein by reference.

BACKGROUND

Technical Field

Embodiments of the present invention relate generally to digital smart grid systems and, more specifically, to a dual mode smart grid meter.

Description of the Related Art

Utility companies typically measure customer consumption of a commodity, such as electrical power or water, via a utility meter located at a customer premise. Historically, an individual would travel to the customer premise and visually inspect the utility meter to record an indicated consumption value. A subsequent generation of utility meter employs a radio communications technology known in the art as an automatic meter reading (AMR), which enables utility meters to be read via a wireless meter reader. An AMR utility meter periodically transmits a consumption value, and the wireless meter reader typically listens for asynchronously arriving transmissions from AMR utility meters. In a typical usage scenario, a wireless meter reader is disposed within a motor vehicle, which drives slowly along different customer streets to allow the wireless meter reader to accumulate customer consumption data.

While utility meters employing AMR wireless transmission technology are an improvement in both meter reading accuracy and efficiency, a person still needs to travel near each utility meter to take a reading from the meter, potentially introducing human error in the process. Advanced metering infrastructure (AMI) technology enables utility meters to form bidirectional mesh networks, enabling a reader system to access a distant utility meter without needing to be in near physical proximity to the distant utility meter. A utility network built out to exclusively implement AMI meters enables tremendous efficiency and accuracy because each utility meter within the network may be read from a central location with little opportunity for human error. However, many utility operators have already invested significant resources to upgrade manually-read utility meters to meters with AMR technology. AMR systems and AMI systems may employ orthogonal communication protocols and architectures, and therefore do not conventionally inter-operate. As a consequence, the conventional upgrade path from AMR meters to AMI meters requires a substantial system overhaul, which many utility operators are reluctant to implement.

As the foregoing illustrates, what is needed in the art is a wireless utility meter system architecture that enables efficient use of both AMR to AMI technologies.

SUMMARY

One embodiment of the present invention sets forth a computer-implemented method for transmitting metrology data, the method comprising determining whether an automatic meter reading (AMR) data packet should be transmitted or an advanced metering infrastructure (AMI) data packet should be transmitted, and if the AMR data packet should be transmitted, then transmitting the AMR data packet, or if the AMI data packet should be transmitted, then transmitting the AMI data packet.

One advantage of the disclosed technique is that a utility meter may be deployed to operate within an AMR system, but later operate beneficially within an AMI system without requiring a service interruption or physical upgrade.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
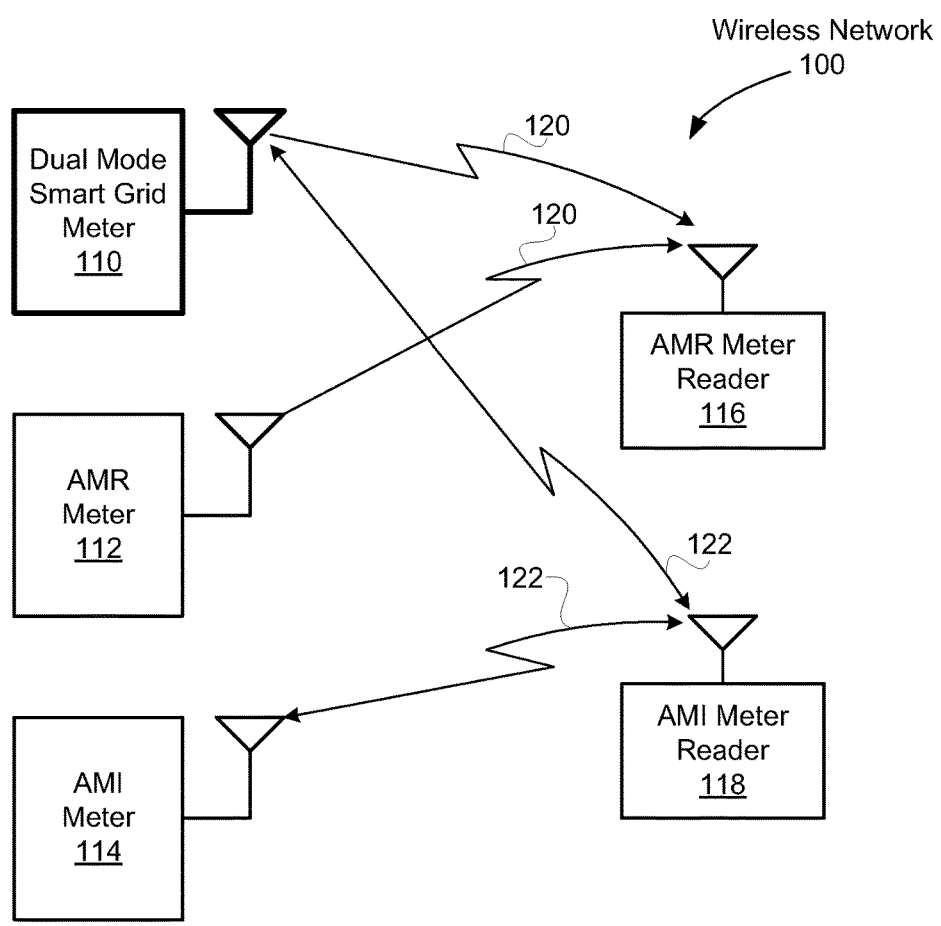
FIG. 1 illustrates a wireless network, configured to implement one or more aspects of the present invention.

FIG. 1 illustrates a wireless network 100, configured to implement one or more aspects of the present invention. Wireless network 100 may include an automatic meter reading (AMR) meter reader 116, an advanced metering infrastructure (AMI) meter reader 118, a dual mode smart grid meter 110, an AMR meter 112, and an AMI meter 114.

As shown, AMR meter reader 116 may passively accumulate meter readings from AMR meter 112 and dual mode smart grid meter 110 via wireless channel 120, which conforms to AMR wireless protocol standards. Additionally, AMI meter reader 118 may query or control AMI meter 114 and dual mode smart grid meter 110 via wireless channel 122, which conforms to AMI wireless protocol standards.

Persons skilled in the art will recognize that a conventional AMI meter 114 is not readable via a conventional AMR meter reader 116, while a conventional AMI meter reader 118 may not be operable within an AMR system. Dual mode smart grid meter 110 is configured to beneficially operate according to both AMR and AMI protocols. Dual mode smart grid meter 110 may be deployed within an existing AMR network without requiring operational changes by a utility operator. The utility operator may therefore incrementally upgrade their AMR networks by installing dual mode smart grid meters 110 at an appropriate pace without disrupting their existing AMR reading operations. The utility operator may then switch over to reading operations based on AMI when appropriate, such as after a certain region has been completely or substantially upgraded to AMI utility meters. In one embodiment, dual mode smart grid meter 110 is configured to operate as an AMR reader and an AMI meter. Here, the AMI meter functionality enables dual mode smart grid meter 110 to participate within an AMI network, such as a wireless AMI mesh network. In such an embodiment, dual mode smart grid meter 110 reads data from a collection of one or more AMR meters and presents the data to the AMI network. In this way, dual mode smart grid meter 110 may act as a bridge between the collection of one or more AMR meters and the AMI network. Any technically feasible technique may be implemented to represent the collection of one or more AMR meters to the AMI network without departing the scope and spirit of the present invention.

Figure 2:
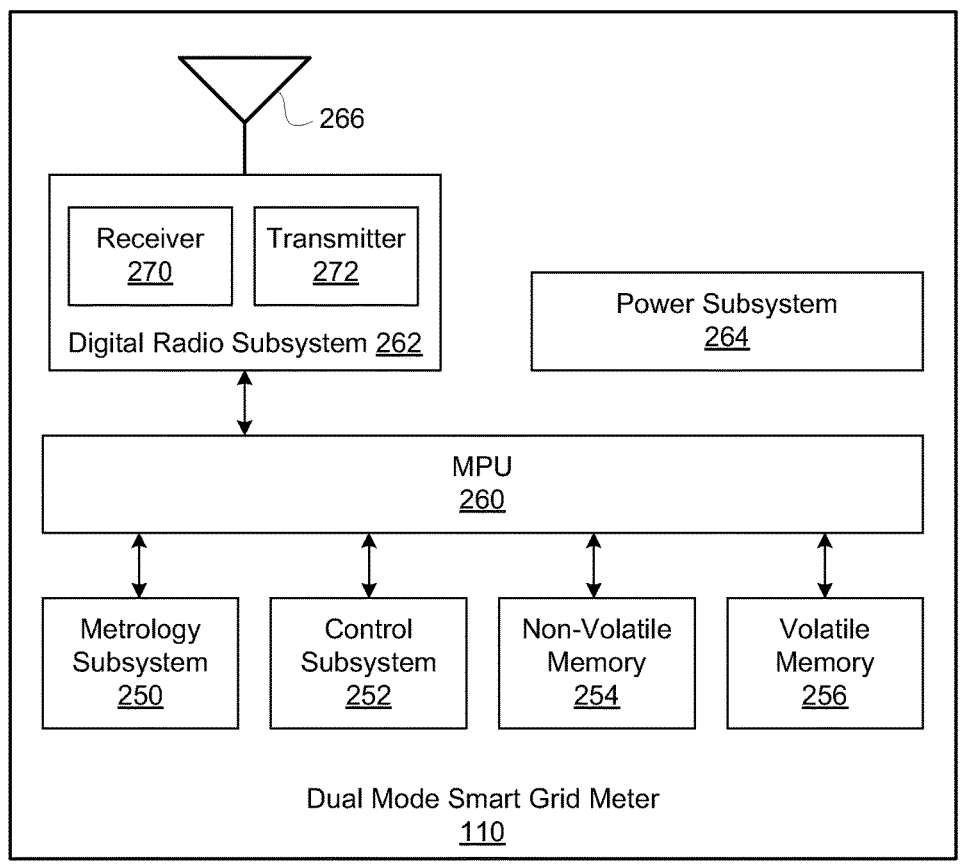
FIG. 2 is a block diagram of a dual mode smart grid meter, according to one embodiment of the present invention.

FIG. 2 is a block diagram of dual mode smart grid meter 110 of FIG. 1, according to one embodiment of the present invention. Dual mode smart grid meter 110 comprises a processing unit, such as microprocessor unit (MPU) 260, a digital radio subsystem 262, a power subsystem 264, an antenna 266, a non-volatile memory 254, volatile memory 256, and a metrology subsystem 250. Certain embodiments also comprise one or more additional elements, such as a control subsystem 252.

MPU 260 includes a processor core configured to retrieve and execute programming instructions from non-volatile memory 254. In one embodiment, the instructions cause MPU 260 to perform as both an AMR meter and an AMI meter, as described below in FIG. 4. During the course of executing the programming instructions, the processor core may also store and retrieve data residing within the volatile memory 256. Digital radio subsystem 262 comprises a radio receiver circuit 270, configured to demodulate and digitize incoming RF electrical signals. Digital radio subsystem 262 also comprises a radio transmitter circuit 272, configured to modulate a digital signal to generate RF electrical signals for transmission. In one embodiment, receiver circuit 270 and transmitter circuit 272 are implemented using a single RF conversion stage, and a digital signal processor, as described below in FIG. 3.

Antenna 266 converts incident electromagnetic energy into the incoming RF electrical signals and also converts the RF electrical signals for transmission into radiated electromagnetic energy. Power subsystem 264 comprises regulation and power conversion circuitry configured to provide electrical voltage sources to each circuit and subsystem within dual mode smart grid meter 110. Power subsystem 264 may also include an energy source such as a photovoltaic system, a battery, or fuel cell. In one embodiment, mode smart grid meter 110 includes a local area network interface configured to enable external devices to communicate to MPU 260.

Metrology subsystem 250 comprises circuitry configured to perform one or more measurements, such as voltage, current, power, accumulated power, flow rate, accumulated flow, temperature, humidity, vibration, or any other quantifiable physical value or metric. Metrology subsystem 250 quantizes measured results into corresponding digital values for processing and storage by MPU 260. In one embodiment, metrology subsystem 250 comprises a power meter for measuring accumulated utilization of power. The control system 252 comprises one or more switches for controlling electrical signals. In one embodiment, control system 252 is a power switch for turning electrical power on or off, such as to enable service interruption and service continuation functionality within dual mode smart grid meter 110.

Figure 3:
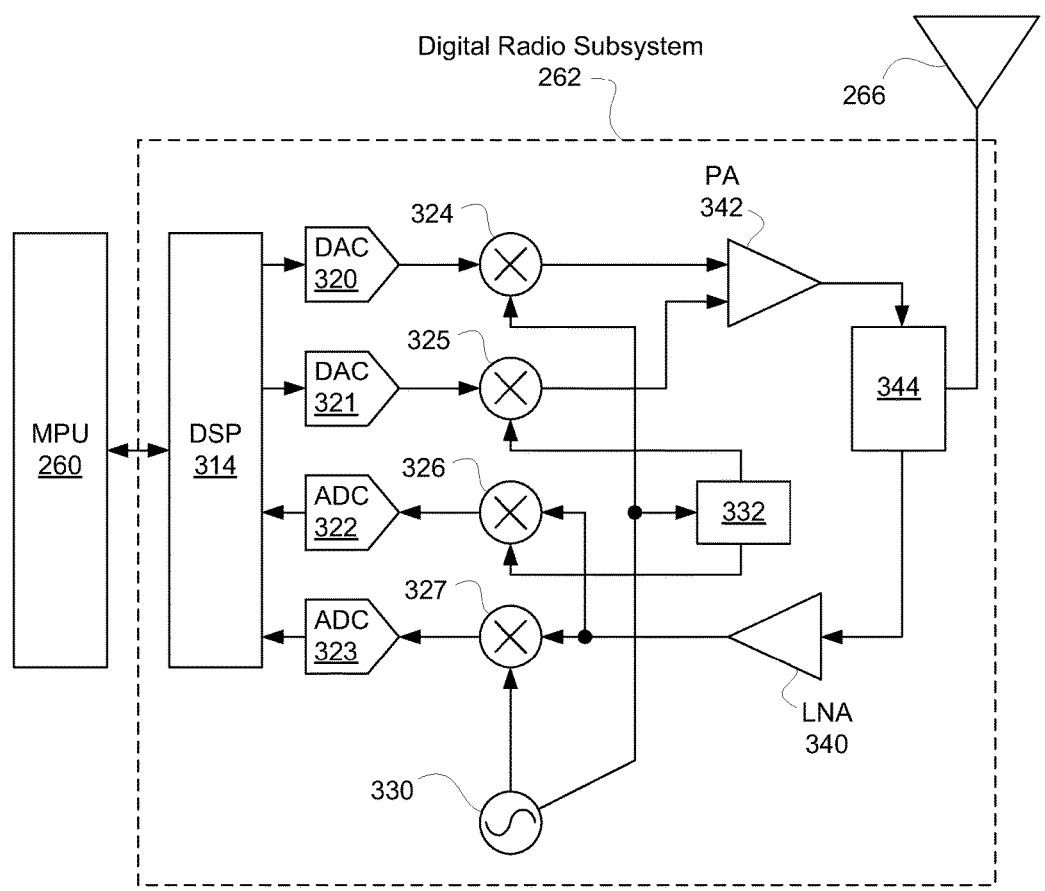
FIG. 3 illustrates a digital radio subsystem, according to one embodiment of the present invention.

FIG. 3 illustrates digital radio subsystem 262 of FIG. 2, according to one embodiment of the present invention. Digital radio subsystem 262 may include, without limitation, a digital signal processor (DSP) 314, digital to analog converters (DACs) 320, 321, analog to digital converters (ADCs) 322, 323, analog mixers 324, 325, 326, 327, a phase shifter 332, an oscillator 330, a power amplifier (PA) 342, a low noise amplifier (LNA) 340, an antenna switch 344, and antenna 266.

In one embodiment, the MPU 260 implements procedures for processing data packets transmitted or received as payload data by digital radio subsystem 262. The procedures for processing the data packets may include, without limitation, wireless routing, encryption, authentication, protocol translation, and routing between and among different wireless and wired network ports.

DSP 314 implements signal processing procedures for modulating a serialized representation of payload data comprising packets, such as data packets conforming to AMR transmission protocols or AMI transmission protocols. The serialized representation may encode one or more bits of payload data per modulation symbol or less than one bit per modulation symbol. A receiver may demodulate each modulation symbol to recover the one or more bits of payload data. In one embodiment the one or more bits of payload data are used to generate a corresponding data packet.

DSP 314 may implement multi-channel modulation for simultaneous transmission of independent units of payload data via multiple, independent channels. Each independent channel occupies a different frequency range in a frequency domain representation of a transmitted radio signal. DSP 314 may also implement corresponding signal processing procedures for receiving payload data. The procedures may include, without limitation filtering, energy detection, signal characterization, and simultaneous demodulation of multiple, independent channels.

In one embodiment, DSP 314 is configured to modulate data within a given channel using a particular modulation technique that is selected form a set of different modulation techniques. For example, DSP 314 may modulate data according to AMR specifications to generate a periodic data packet including metrology data. DSP 314 may also demodulate a signal from a given channel according to AMR specifications to act as an AMR receiver. Additionally, DSP 314 may be configured to perform modulation and demodulation signal processing according to AMI specifications to act as an AMI utility meter. DSP 314 or MPU 260 may be configured to translate AMR data read from a different utility meter into an equivalent representation for transmission via AMI protocols. Any technically feasible modulation, demodulation, filtering, energy detection, and signal characterization techniques may be implemented by DSP 314 without departing the scope and spirit of embodiments of the present invention.

DSP 314 is coupled to DAC 320 and DAC 321. Each DAC 320, 321 is configured to convert a stream of outbound digital values into a corresponding analog signal. The outbound digital values are computed by the signal processing procedures for modulating one or more channels. DSP 314 is also coupled to ADC 322 and ADC 323. Each ADC 322, 323 is configured to sample and quantize an analog signal to generate a stream of inbound digital values. The inbound digital values are processed by the signal processing procedures to demodulate and extract payload data from the inbound digital values.

In one embodiment, DSP 314 generates two modulated streams of outbound digital values, which are converted to corresponding analog quadrature signals by DACs 320, 321. The analog quadrature signals are separately mixed with a radio frequency (RF) carrier signal by analog mixers 324, 325 to generate corresponding quadrature RF signals, each having a frequency domain image centered about the frequency of the RF carrier signal. Oscillator 330 generates the RF carrier signal and phase shifter 332 generates a 90-degree shifted representation of the RF carrier signal for generating quadrature RF signals. PA 342 combines the quadrature RF signals to generate a modulated RF signal, which is coupled through antenna switch 344 to the antenna 266. Antenna 266 converts the modulated RF signal from an electrical representation to an electromagnetic representation for wireless transmission.

Antenna 266 may convert an incoming electromagnetic RF signal to an electrical RF signal, which is coupled through the antenna switch 344 to the LNA 340. LNA 340 amplifies the electrical RF signal and couples the amplified RF signal to analog mixers 326 and 327. The amplified RF signal is characterized as having a signal image centered about an RF carrier frequency. The analog mixer 327 shifts the signal image down in frequency to an in-phase baseband component of the signal image. The signal is in-phase with respect to the RF carrier signal generated by oscillator 330. Analog mixer 326 shifts the signal image down in frequency to a 90-degree shifted baseband component of the signal image. The in-phase and 90-degree shifted baseband signals comprise a quadrature representation of one or more channels within the electrical RF signal. A plurality of different frequency channels may be represented within the baseband signals. DSP 314 is configured to map the stream of inbound digital values, comprising a time domain representation of the baseband signals, to a frequency domain representation of the baseband signals. Persons skilled in the art will recognize that the frequency domain representation may be used to efficiently isolate one data bearing signal within one channel from a signal within a different channel. Similarly, the frequency domain representation may be used to detect noise and interfering transmissions within a given channel.

In one embodiment, oscillator 330 can be programmed to generate one selected frequency from a plurality of possible frequencies. Each of the plurality of frequencies corresponds to a different channel. The selected frequency determines a center channel for a range of channels that are concurrently available for processing by DSP 314 to receive or transmit data. For example, if a frequency range of 4 MHz defines ten channels, then each channel is allocated a bandwidth of 400 kHz. In this example, a frequency range of 2,000 kHz representing five channels is processed by DSP 314 for transmitting or receiving data on one or more of the five channels. If oscillator 330 is programmed to generate a different selected frequency, then a different set of five concurrently available channels may be used for transmitting or receiving data. The center channel may be changed arbitrarily by programming oscillator 330 independently of DSP 314 operating on the concurrently available channels. Digital radio subsystem 262 may be configured with an arbitrary number of concurrently available channels, each having an arbitrary bandwidth without departing the scope and spirit of embodiments of the present invention.

Figure 4:
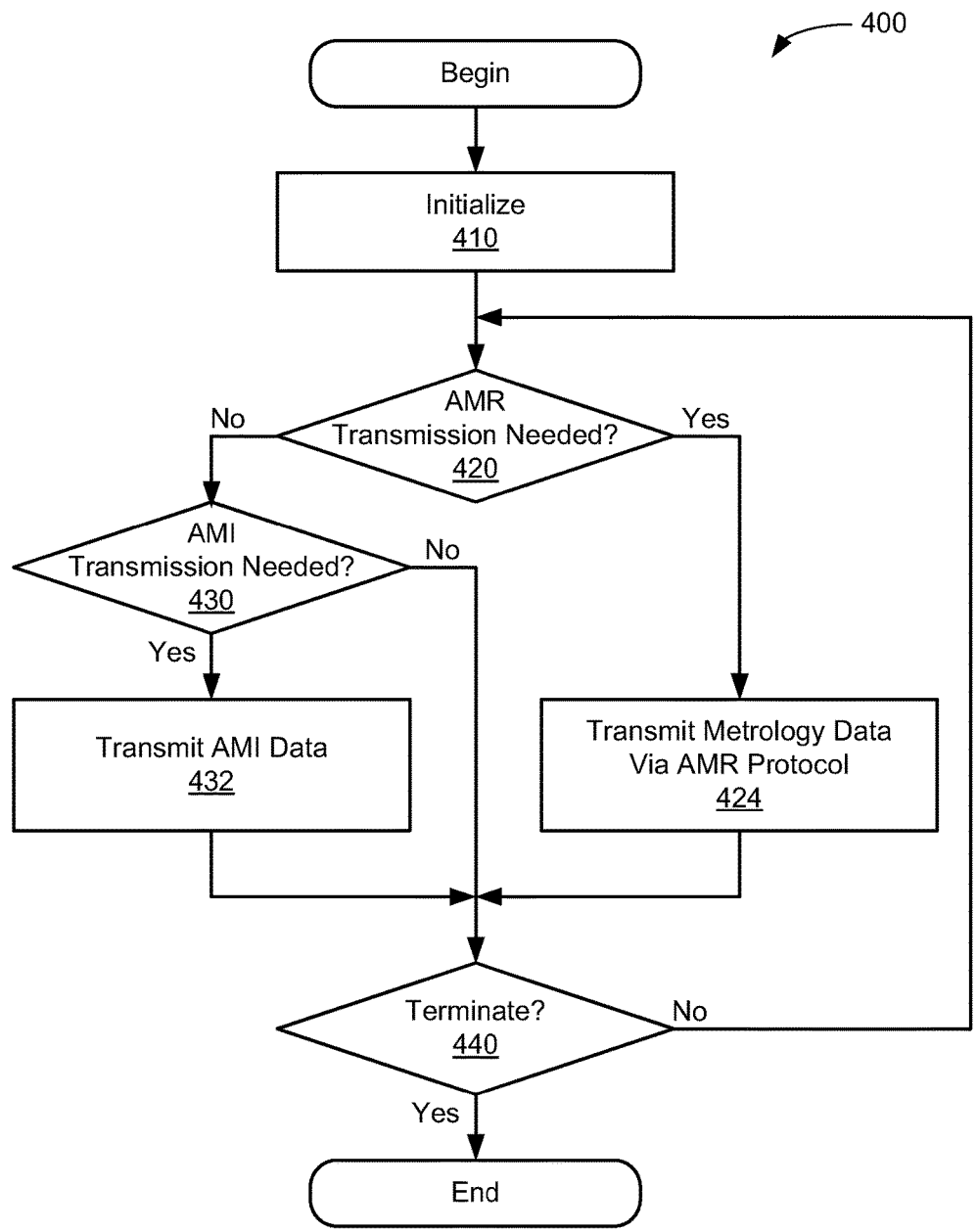
FIG. 4 is a flow diagram of method steps for providing metrology data via two orthogonal protocols, according to one embodiment of the invention.

FIG. 4 is a flow diagram of method steps for providing metrology data via two orthogonal protocols, according to one embodiment of the invention. Although the method steps are described in conjunction with the systems of FIGS. 1-3, persons of ordinary skill in the art will understand that any system configured to perform the method steps, in any order, is within the scope of the invention.

As shown, a method 400 begins in step 410, where a dual mode smart grid meter, such as dual mode smart grid meter 110 of FIG. 1, performs an initialization procedure. The initialization procedure is implementation dependent and may include setting default values for subsequent operation, calibration steps, authentication steps, hardware configuration steps, and the like. When performed by dual mode smart grid meter 110, the initialization procedure should include configuring digital radio subsystem 262 to receive AMI data packets. In alternative embodiments, dual mode smart grid meter 110 may implement a dedicated AMI receiver.

If, in step 420, an AMR transmission is needed then the method proceeds to step 424. In one configuration, an AMR transmission timer indicates that an AMR metrology transmission is needed, when a specified time duration has lapsed. The AMR transmission timer may be implemented using any technically feasible technique. In step 424, the dual mode smart grid meter transmits metrology data via an AMR protocol. Step 424 may include procedures that read metrology data from a measurement instrument and configure digital radio subsystem 262 for operation as an AMR transmitter. If, in step 440, the method should terminate, then the method terminates, otherwise the method returns to step 420.

Returning now to step 420, if an AMR transmission is not needed, then the method proceeds to step 430. If, in step 430, an AMI transmission is needed, then the method proceeds to step 432. An AMI transmission may be required, for example, in response to AMI data being received via digital radio subsystem 262. Such received AMI data may comprise a data packet to be forwarded from one AMI meter to another. Other received AMI data may comprise a read request from an AMI meter reader, such as AMI meter reader 118. In another example, dual mode smart grid meter 110 is configured to read data from one or more AMR meters and transmit the data to an AMI wireless network. In such an example, an AMI transmission is needed to transmit data read from a remote AMR meter. In step 432, the dual mode smart grid meter transmits outbound AMI data according to well-known AMI specifications. The outbound AMI data may comprise a data packet received via digital radio subsystem 262 to be forwarded to another AMI receiver. The outbound AMI data may also comprise a data packet generated as a response to a read request from the AMI meter reader. Step 432 may include procedures that read metrology data from a measurement instrument, and procedures that configure transmitter 272 within digital radio subsystem 262 to operate as an AMI transmitter to transmit the outbound AMI data. The outbound AMI data may also comprise a data packet generated in response to a control command, such as a command for operating a service interruption relay. The service interruption relay may turn power on or turn power off for a downstream client. The service interruption relay may also turn gas or water service on or off for a downstream client.

Returning now to step 430, if AMI data has not been received, then the method proceeds to step 440, as previously described herein.

In alternative embodiments, steps 420 and 430 may be performed in reverse priority so that responding to an AMI data packet received priority over periodic AMR metrology transmissions.

In sum, a technique for implementing a dual mode smart grid meter is disclosed. The dual mode smart grid meter is configured to transmit AMR metrology data and to perform as an AMI smart grid meter. The technique involves determining whether to transmit a packet of AMR metrology data or to respond to an AMI request. A digital radio subsystem may be configured to transmit AMR data, transmit AMI data, and receive AMI data.

One advantage of the disclosed technique is that a utility meter may be deployed to operate within an AMR system, but later operate beneficially within an AMI system without requiring a service interruption or physical upgrade.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

I claim:

1. A method for transmitting metrology data that is implemented in a dual-mode meter, the method comprising:
    determining whether an automatic meter reading (AMR) data packet should be transmitted or an advanced metering infrastructure (AMI) data packet should be transmitted via a digital radio subsystem; and
    if an AMR data packet should be transmitted, then:
        configuring a first processing unit included in the digital radio subsystem for modulating data packets in accordance with one or more AMR communications protocols, and
        transmitting one or more AMR data packets via the digital radio subsystem, and
    if an AMI data packet should be transmitted, then:
        reading a first AMR data packet transmitted from a radio subsystem of a remote AMR meter,
        converting the first AMR data packet into modified data for transmission via one or more AMI communications protocols,
        generating a first AMI data packet based on the modified data,
        configuring the first processing unit for modulating data packets in accordance with the one or more AMI communications protocols, and
        transmitting the first AMI data packet via the digital radio subsystem.

2. The method of claim 1, further comprising changing a state of a service interruption relay in response to an AMI data packet.

3. The method of claim 1, further comprising initializing a configurable receiver to operate as an AMI receiver capable of receiving an inbound AMI data packet.

4. The method of claim 1, wherein transmitting the AMR data packet comprises:
    reading metrology data from a metrology circuit; and
    configuring a transmitter circuit to operate as an AMR transmitter.

5. The method of claim 1, wherein transmitting the first AMI data packet comprises:
    reading metrology data from a metrology circuit; and
    configuring a transmitter circuit to operate as an AMI transmitter.

6. The method of claim 1, wherein the AMR data packet should be transmitted if an AMR transmission timer determines that a specified duration of time has lapsed.

7. The method of claim 1, wherein the AMI data packet should be transmitted if an AMI meter read request has been received or if a data packet to be forwarded to another AMI device has been received.

8. The computer-implemented method of claim 1, wherein configuring the digital radio subsystem comprises executing instructions that cause a multiprocessor unit to operate as both an AMR meter and an AMI meter.

9. A non-transitory computer-readable storage medium including instructions that, when executed by a processing unit in a dual-mode meter, cause the processing unit to transmit metrology data via a radio signal by performing the steps:
    determining whether an automatic meter reading (AMR) data packet should be transmitted or an advanced metering infrastructure (AMI) data packet should be transmitted via a digital radio subsystem; and
    if an AMR data packet should be transmitted, then:
        configuring a first processing unit included in the digital radio subsystem for modulating data packets in accordance with one or more AMR communications protocols, and
        transmitting one or more AMR data packets via the digital radio subsystem, and
    if an AMI data packet should be transmitted, then:
        reading a first AMR data packet transmitted from a radio subsystem of a remote AMR meter,
        converting the first AMR data packet into modified data for transmission via one or more AMI communications protocols,
        generating a first AMI data packet based on the modified data,
        configuring the first processing unit for modulating data packets in accordance with the one or more AMI communications protocols, and
        transmitting the first AMI data packet via the digital radio subsystem.

10. The non-transitory computer-readable storage medium of claim 9, further comprising changing state of a service interruption relay in response to an AMI data packet.

11. The non-transitory computer-readable storage medium of claim 9, further comprising initializing a configurable receiver to operate as an AMI receiver capable of receiving an inbound AMI data packet.

12. The non-transitory computer-readable storage medium of claim 9, wherein transmitting the AMR data packet comprises:
    reading metrology data from a metrology circuit; and
    configuring a transmitter circuit to operate as an AMR transmitter.

13. The non-transitory computer-readable storage medium of claim 9, wherein transmitting the first AMI data packet comprises:
    reading metrology data from a metrology circuit; and configuring a transmitter circuit to operate as an AMI transmitter.

14. The non-transitory computer-readable storage medium of claim 9, wherein the AMR data packet should be transmitted if an AMR transmission timer determines that a specified time duration has lapsed.

15. The non-transitory computer-readable storage medium of claim 9, wherein the AMI data packet should be transmitted if an AMI meter read request has been received or if a data packet to be forwarded has been received.

16. A dual-mode meter, comprising:
a digital radio circuit configured to generate a radio signal for data transmission and to receive a signal for data reception;
a metrology circuit configured to perform physical measurements; and
a processing unit that is coupled to the digital radio circuit and the metrology circuit and configured to:
  initialize the digital radio circuit to operate as an advanced metering infrastructure (AMI) receiver capable of receiving an inbound AMI data packet;
  determine whether an automatic meter reading (AMR) data packet should be transmitted or an AMI data packet should be transmitted; and
  if an AMR data packet should be transmitted, then:
    configuring a first processing unit included in the digital radio circuit for modulating data packets in accordance with one or more AMR communications protocols, and
    transmitting one or more AMR data packets via the digital radio circuit, and
  if an AMI data packet should be transmitted, then:
    reading a first AMR data packet transmitted from a radio subsystem of a remote AMR meter,
    converting the first AMR data packet into modified data for transmission via one or more AMI communications protocols,
    generating a first AMI data packet based on the modified data,
    configuring the first processing unit for modulating data packets in accordance with the one or more AMI communications protocols, and
    transmitting the first AMI data packet via the digital radio circuit.

17. The wireless metering device of claim 16, wherein transmitting the AMR data packet comprises:
reading metrology data from a metrology circuit; and
configuring a transmitter circuit to operate as an AMR transmitter.

18. The wireless metering device of claim 16, wherein transmitting the first AMI data packet comprises:
reading metrology data from a metrology circuit; and
configuring a transmitter circuit to operate as an AMI transmitter.

19. The wireless metering device of claim 16, wherein the AMR data packet should be transmitted if an AMR transmission timer determines that a specified time duration has lapsed, otherwise the AMI data packet should be transmitted if the inbound AMI data packet was received.

* * * * *